UNITED STATES PATENT OFFICE.

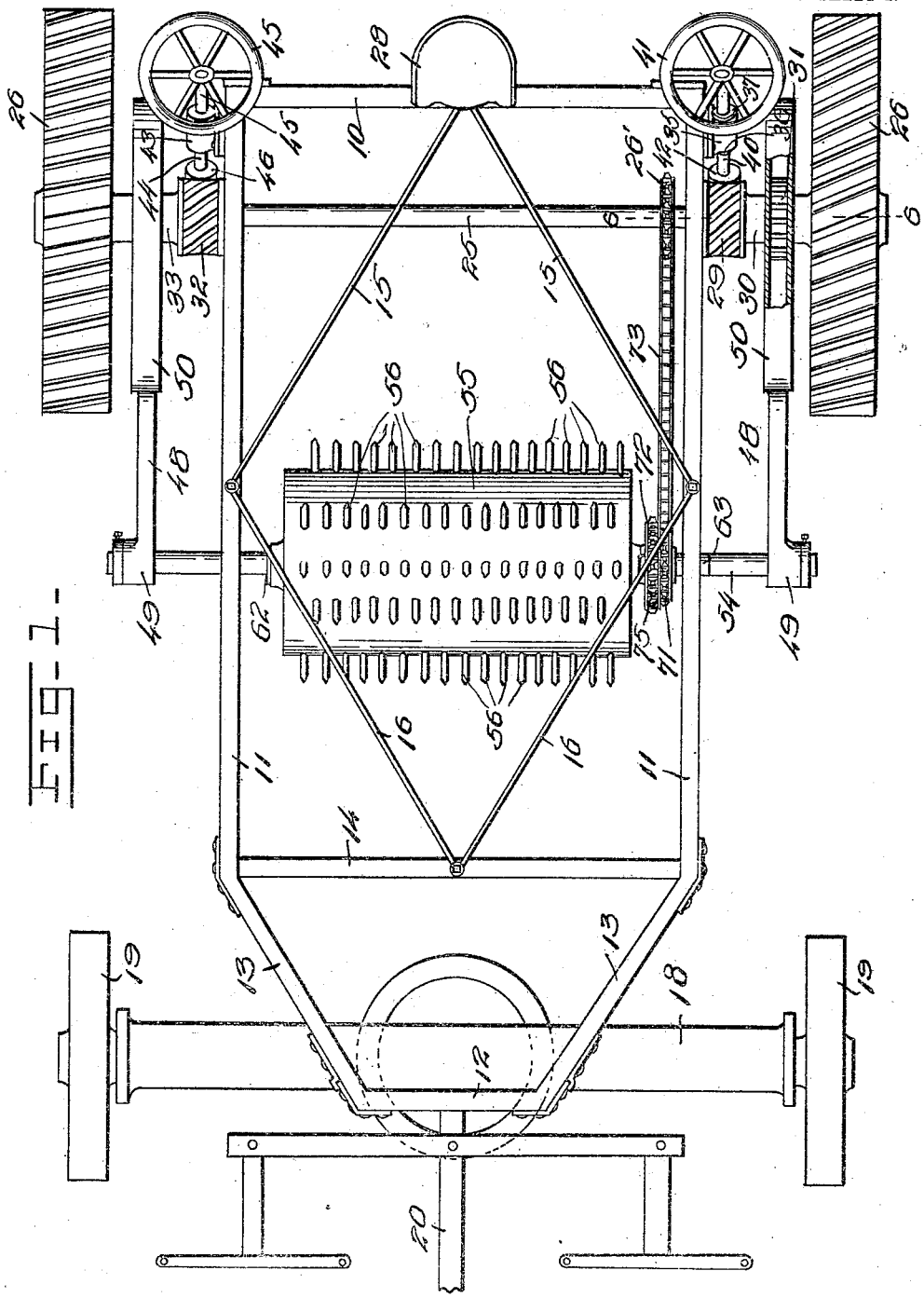

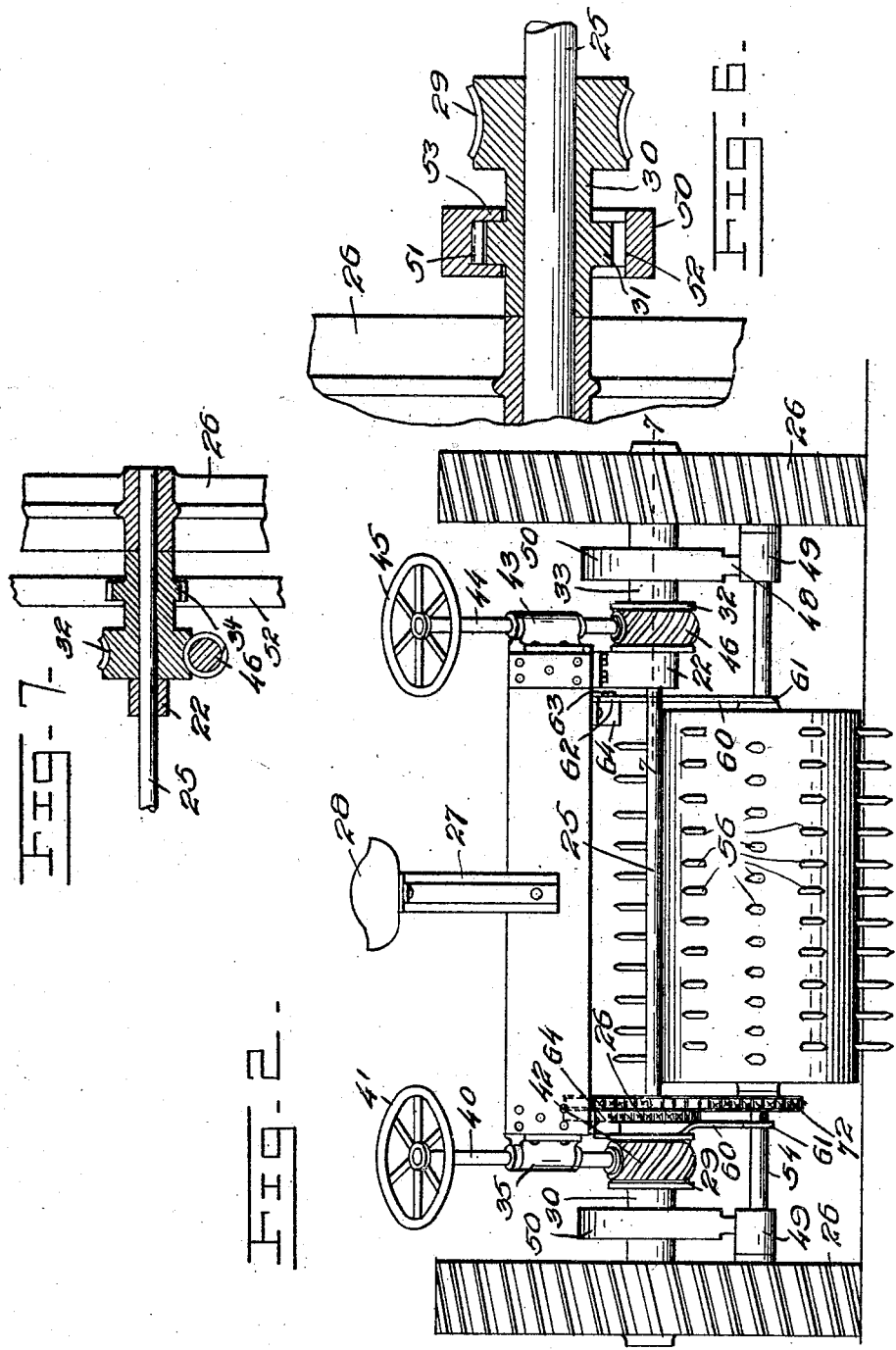

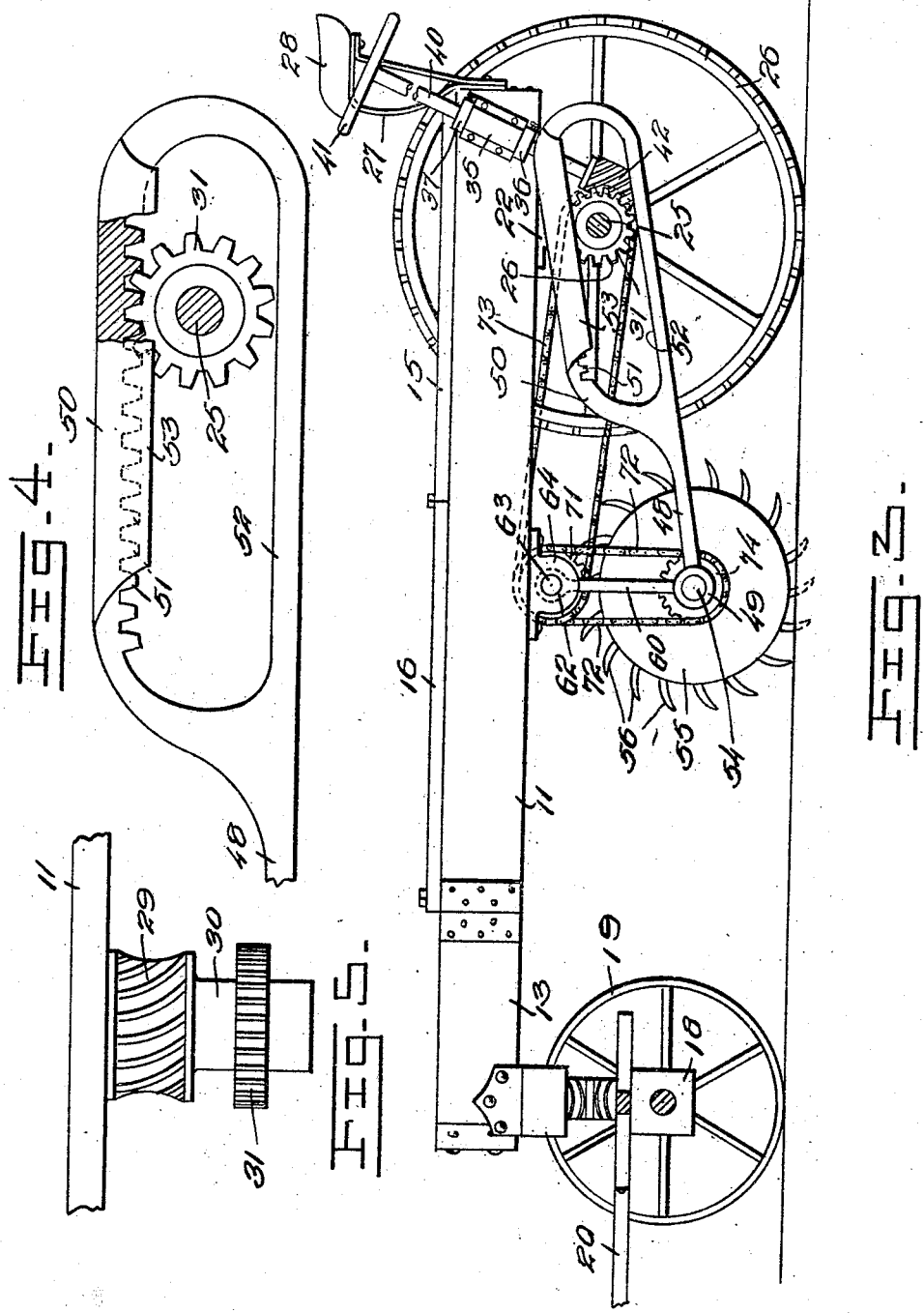

JOHN H. ROGGE, OF SMISHEK, NORTH DAKOTA.

BREAKING-PLOW.

959,390.   Specification of Letters Patent.   Patented May 24, 1910.

Application filed June 26, 1909. Serial No. 504,532.

*To all whom it may concern:*

Be it known that I, JOHN H. ROGGE, a citizen of the United States, residing at Smishek, in the county of Ward and State of North Dakota, have invented certain new and useful Improvements in Breaking-Plows, of which the following is a specification.

The object of my invention is, to provide a plow more particularly adapted to be used in breaking the top soil of unplowed fields, and it is also adapted to be used for general plowing purposes, and surface cultivation.

Another object is, to provide a plow having a cylindrical body upon which are arranged a multiple series of cutting teeth, the plow being so carried that the teeth can be thrown into or out of contact with the earth, to form a cut of a pre-determined depth.

With these and other objects in view, the present invention consists in the combination and arrangement of parts as will be hereinafter more fully described and particularly pointed out in the appended claims, it being understood that changes in the specific structure shown and described may be made within the scope of the claims without departing from the spirit of the invention.

In the drawings forming a portion of this specification, in which like numerals of reference indicate similar parts in the several views, Figure 1 shows a top view of the plow embodying my invention. Fig. 2 is a rear view. Fig. 3 is a side elevation. Fig. 4 is a detached detail of one of the rack bars. Fig. 5 is a detached detail of one of the worm gears. Fig. 6 is a sectional view through one of the rack loops and engaging pinions. Fig. 7 is a horizontal sectional view through one of the worms and connected pinions.

In carrying out the object of my invention, I employ a frame preferably made of iron, comprising the rear member 10, from which extend the two similar side members 11, which are secured to the bar 12 by means of the side members 13. Near the front, the frame is strengthened by means of the transverse bar 14, while the sides 11 are connected to the rear bar by means of the brace rods 15, while extending from the transverse bar 14 to the sides 11 are the brace rods 16 to impart rigidity to the carrying frame. In front I provide the axle 18 carrying the wheels 19, the tongue 20 being secured to the forward axle 18 in the usual manner.

Held within the bearings 22, secured to the side members 11, is the rear axle 25 to which the rear supporting wheels 26 are secured, the axle 25 being revolubly held within its bearings. Near one end, and between the frame members 11, the axle is provided with the driving chain sprocket 26'. Projecting from this carrying frame is the supporting bar 27, carrying at its end the driver's seat 28.

Secured to the driving axle 25 at one end is the worm gear 29, from which extends the collar 30 to which is secured the gear wheel 31, the worm gear, collar and gear being carried integrally, and being revolubly held on the rear axle. At the opposite end I provide the worm gear 32, collar 33 and the gear 34.

Secured to the frame adjacent to the worm gear 29 is the bearing 35, through which extends the worm shaft 40, having the operating wheel 41 at one end and the worm 42 at the opposite end. This worm 42 connects with the worm gear 29. The shaft 40 is held within the bearing by means of the collars 36 and 37.

Upon the opposite side of the carrying frame I provide the bearing plate 43, carrying the worm shaft 44, provided with the operating wheel 45 and at the lower end with the worm 46, this worm connecting with the worm gear 32, as shown. By means of the worms the gears 31 and 34 may be rotated. Adjustably held upon each of these gears 31 and 34 is a rack comprising the stem 48 provided below with the bearing 49, while the upper portion of the stem is in the form of a loop, as shown at 50, one inner edge of this loop being provided with the rack 51, the opposite edge of the loop, however, being smooth as shown at 52. The rack teeth are held between the side flanges 53, these gears 31 and 34 being of such a size that when rotating within the loops, the loops are tightly held to the gears. The flanges 53 do not extend the full length of the rack side of the loop so that the gears can be readily introduced between the flanges 53. The construction, then, permits the gears being rotated backward and forward in rotating the worms. Held within the terminal bearings 49 of these stems 48 is the shaft 54 and secured to this shaft 54 is a drum 55 from which drum extend the blades 56, these cutting blades having their ends slightly crooked as shown. The cutting teeth are secured in multiple series, in parallel rows about the outer surface of the cylinder.

Held to each end of the drum shaft 54 are the hangers having bearings 60, within their lower ends and the bearing eyes 62 at their upper ends, as shown. These hangers are secured to the stub shaft 63, held within the bearings 64, the bearings in turn being secured to the side frame members 11, as shown. By means of these hangers 60 the drum is held in adjustable position and may be swung backward and forward by means of the rack bars 48.

Secured to one of the stub shafts 63, is the chain sprocket 71 to which is connected the chain sprocket 75, as shown in Fig. 1. Passing over the sprockets 75 and 74 is the chain 72, while passing over the sprocket 71 and the sprocket 26' is the driving chain 73. As the machine is carried through the field, the wheels rotate the rear axle 25, and this rotary movement by means of the chain 73 is imparted to the drum in the manner set forth.

The operation of my device is very simple, in going to or coming from the work field, the worm shafts are operated to carry the rack bars into a rearward position, to raise the drum 55 a suitable distance from the ground. Arriving at the field, the operator successively rotates the worm shafts 40 and 44 to carry the blade carrying drum in a downward position, so that the blades will cut into the earth a suitable distance. When both of the hangers 60 are held in exact alinement, the drum 55 will be held parallel above the surface of the earth. In adjusting one of the hangers, however, so that the same will have its lower bearing end slightly forward or rearward of the opposite bearing end of the hanger, the shaft 49 will be held at an angle to the earth surface, so that the teeth within the drum at one end will cut deeper into the earth than at the opposite end. By means of the worm and pinions these rack bars are positively held, while the drum is held against any vertical movement while being carried through the earth by means of the hangers. The device is simple of construction and positive of operation, and the instrumentalities can be readily adjusted.

What is claimed is:

1. The combination with a wheel-supported driving axle, of a frame carried by said axle, a chain sprocket secured to said axle, a drum, cutting blades projecting from said drum, hangers securing said drum to said frame, a chain sprocket carried by said drum, a chain passing over said sprockets, a gear revolubly secured on said axle, a rack secured at one end to said drum, said rack end engaging said gear, and means to operate said gear.

2. The combination with a wheel-supported axle, of a frame carried by said axle, a chain sprocket secured to said axle, a drum, cutting blades projecting from said drum, hangers securing said drum to said frame, a chain passing over said sprocket and operatively connected to said cylinder, a gear revolubly secured to said axle near each end, a bar provided with a rack secured to each end of said drum, the rack of said bar engaging said gears, and arranged to be actuated by said gears.

3. The combination with a wheel-supported driving axle, of a frame carried by said axle, a chain sprocket secured to said axle, a drum, a shaft carried by said drum, blades projecting from said drum, a hanger secured to each end of said shaft and secured to said frame, a chain sprocket secured to said drum shaft, chains passing over said sprockets, a gear revolubly secured to each end of said axle, a worm pinion secured to each of said gears, a link secured to each end of said drum shaft, said links having racks, said racks engaging said gears, and a worm secured to each side of said frame to engage said worm pinions, as and for the purpose set forth.

In testimony whereof I affix my signature, in presence of two witnesses.

JOHN H. ROGGE.

Witnesses:
ADOLPH GARNES,
SAM SWANSON.